US 9,701,204 B2
(12) United States Patent
Suzuki

(10) Patent No.: US 9,701,204 B2
(45) Date of Patent: Jul. 11, 2017

(54) IN-WHEEL MOTOR DRIVE DEVICE

(71) Applicant: NTN CORPORATION, Osaka-shi, Osaka (JP)

(72) Inventor: Kenichi Suzuki, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 15/220,019

(22) Filed: Jul. 26, 2016

(65) Prior Publication Data
US 2016/0332521 A1 Nov. 17, 2016

Related U.S. Application Data

(63) Continuation of application No. PCT/JP2015/051167, filed on Jan. 19, 2015.

(30) Foreign Application Priority Data

Jan. 28, 2014 (JP) .................................. 2014-013290

(51) Int. Cl.
*G05D 23/00* (2006.01)
*B60L 3/00* (2006.01)
(Continued)

(52) U.S. Cl.
CPC .......... *B60L 3/0061* (2013.01); *B60K 7/0007* (2013.01); *B60K 17/043* (2013.01);
(Continued)

(58) Field of Classification Search
CPC ...... B60K 1/00; B60K 2001/006; B60K 7/00; B60K 7/0007; B60K 17/043; H02K 11/25;
(Continued)

(56) References Cited

U.S. PATENT DOCUMENTS 7,959,534 B2 * 6/2011 Kasuga ................. B60K 6/365
                                                     180/65.235
8,950,528 B2   2/2015 Ozaki
(Continued)

FOREIGN PATENT DOCUMENTS

CN   101657343 A    2/2010
CN   103415992 A   11/2013
(Continued)

OTHER PUBLICATIONS

International Preliminary Report on Patentability dated Aug. 11, 2016 in corresponding International Patent Application No. PCT/JP2015/051167.
(Continued)

*Primary Examiner* — Antony M Paul

(57) ABSTRACT

Provided is an in-wheel motor drive device which detects an abnormality with high precision over the entire operation range of a motor by measuring the temperatures of a lubricating oil and a motor coil. The in-wheel motor drive device includes an electric motor (1), a wheel bearing (5), a speed reducer (2), a lubricating oil supply mechanism (Jk), and a controller (U1). An oil temperature sensor (Sb) is disposed in a lubricating oil passage (29) in the speed reducer (2), and a coil temperature sensor (Sa) is disposed on a motor stator. The controller (U1) includes a motor output limit (95) that limits an electric current in the electric motor (1) when at least one of temperatures measured by the oil temperature sensor (Sb) and by the coil temperature sensor (Sa) has exceeded a corresponding predefined threshold.

6 Claims, 5 Drawing Sheets

(51) Int. Cl.
| | |
|---|---|
| *B60L 3/04* | (2006.01) |
| *B60L 11/18* | (2006.01) |
| *B60L 15/02* | (2006.01) |
| *B60L 15/20* | (2006.01) |
| *B60K 7/00* | (2006.01) |
| *H02P 29/64* | (2016.01) |
| *H02P 29/68* | (2016.01) |
| *B60L 15/00* | (2006.01) |
| *B60K 17/04* | (2006.01) |

(52) U.S. Cl.
CPC ............. *B60L 3/04* (2013.01); *B60L 11/1803* (2013.01); *B60L 15/00* (2013.01); *B60L 15/025* (2013.01); *B60L 15/2054* (2013.01); *H02P 29/64* (2016.02); *H02P 29/68* (2016.02); *B60K 17/046* (2013.01); *B60K 2007/0038* (2013.01); *B60K 2007/0092* (2013.01); *B60L 2220/14* (2013.01); *B60L 2220/44* (2013.01); *B60L 2240/36* (2013.01); *B60L 2240/421* (2013.01); *B60L 2240/423* (2013.01); *B60L 2240/425* (2013.01); *B60L 2240/486* (2013.01); *B60L 2240/507* (2013.01); *B60L 2250/16* (2013.01); *Y02T 10/643* (2013.01); *Y02T 10/7005* (2013.01); *Y02T 10/7275* (2013.01)

(58) Field of Classification Search
CPC .. H02K 9/19; H02K 7/08; B60L 15/00; B60L 11/18; B60L 3/0061; B60L 11/1803; H02P 29/68; H02P 29/64; H02P 27/04; H02P 27/06; H02P 1/00; H02P 3/00; H02P 5/00; H02P 6/00
USPC ....... 318/34, 139, 471, 472, 400.01, 400.21, 318/400.22, 400.14, 700, 727, 801, 430, 318/432, 437; 363/40, 44, 95, 120, 174, 363/175; 180/65.25, 269
See application file for complete search history.

(56) References Cited

U.S. PATENT DOCUMENTS

| | | |
|---|---|---|
| 2008/0254935 A1 | 10/2008 | Kasuga et al. |
| 2013/0320747 A1 | 12/2013 | Ozaki |

FOREIGN PATENT DOCUMENTS

| | | |
|---|---|---|
| JP | 2006-96242 | 4/2006 |
| JP | 2008-168790 | 7/2008 |
| JP | 2012-178917 | 9/2012 |
| JP | 2012-209993 | 10/2012 |
| JP | 2013-1203 | 1/2013 |
| JP | 2013-126279 | 6/2013 |

OTHER PUBLICATIONS

International Search Report mailed Mar. 24, 2015 in corresponding International Application No. PCT/JP2015/051167.
Chinese Office Action dated May 10, 2017 in corresponding Chinese Patent Application No. 201580005860.7.

* cited by examiner

RELATIONSHIP BETWEEN TEMPERATURE THRESHOLD AND MOTOR INPUT

TYPICAL EXAMPLE OF LOSS MAP OF SPEED REDUCER

TYPICAL EXAMPLE OF LOSS MAP OF MOTOR

TYPICAL EXAMPLE OF LOSS MAP OF UNIT

IN-WHEEL MOTOR DRIVE DEVICE

CROSS REFERENCE TO THE RELATED APPLICATION

This application is a continuation application, under 35 U.S.C. §111(a), of international application No. PCT/JP2015/051167, filed Jan. 19, 2015, which claims Convention priority to Japanese patent application No. 2014-013290, filed Jan. 28, 2014, the entire disclosures of which are herein incorporated by reference as a part of this application.

BACKGROUND OF THE INVENTION (Field of the Invention)

The present invention relates to an in-wheel motor drive device, and also relates to a technique for detecting an abnormality in the in-wheel motor drive device with high precision using a coil temperature sensor and an oil temperature sensor.

(Description of Related Art)

An in-wheel motor drive device includes a speed reducer, a motor, and a wheel bearing. A loss in the in-wheel motor drive device amounts to the sum of losses in those components of the in-wheel motor drive device. A loss in the speed reducer is mainly attributable to rolling resistance in a bearing section, and/or sliding resistance in a sliding portion. Given that bearing specifications and gaps inside the speed reducer are fixed, the magnitude of a loss due to such resistance depends on the rotation frequency (see FIG. 7).

In the motor, core losses, copper losses, and mechanical losses occupy a large part of a total loss. The magnitude of the copper losses depends on a coil electric current, the magnitude of the core losses depends on the coil electric current and the rotation frequency, and the magnitude of the mechanical losses depends on the rotation frequency. Therefore, the copper losses occupy a large part of the total loss in low-speed high-torque operation, while the core losses and the mechanical losses occupy a large part of the total loss in high-speed low-torque operation (see FIG. 8).

Accordingly, a loss map representing a total loss in an in-wheel motor drive device unit in accordance with the motor rotation frequency and motor torque as illustrated in FIG. 9 has an operation range A, which is occupied by losses attributable to the motor, and an operation range C, which is occupied by losses attributable to the motor and the speed reducer. An operation range B is where losses in the speed reducer and the motor are so small that abnormality detection does not need to be performed while the motor rotation frequency and the motor torque are fall within this range.

The total loss in the in-wheel motor drive device unit in the low-speed high-torque operation, which is represented by range A, is largely attributable to the copper losses in the motor. As a result, in the low-speed high-torque operation, an increase rate of the coil temperature is greater than an increase rate of the temperature of a lubricating oil, such that a change of temperature of the lubricating oil is greatly behind a change of coil temperature. Meanwhile, in the high-speed low-torque operation, which is represented by range C, the total loss in the in-wheel motor drive device unit is largely occupied by the core losses in the motor and the losses in the speed reducer, and the increase rate of the temperature of the lubricating oil is therefore greater than the increase rate of the coil temperature.

A coil temperature sensor is typically disposed between slots of a stator, and the lubricating oil therefore does not easily get on the coil temperature sensor, which makes it unlikely to directly measure the temperature of the lubricating oil with the coil temperature sensor. The temperatures of coils and the stator are increased by the lubricating oil getting on the coils and a stator core, and the coil temperature sensor responds to an increase in the coil temperature caused by conduction and transmission of the heat. An output of the coil temperature sensor therefore involves a significant delay in a response to the temperature of the lubricating oil.

RELATED DOCUMENT

Patent Document

[Patent Document 1] JP Laid-open Patent Publication No. 2012-178917

SUMMARY OF THE INVENTION

In order to detect an abnormality in the in-wheel motor drive device, it is conceivable to detect a temperature, particularly the temperature of the coil and the temperature of the lubricating oil. The coil temperature sensor is disposed between the slots of the stator to avoid an influence of the lubricating oil, and the lubricating oil does not easily get thereon. Meanwhile, a sensor to measure the temperature of the lubricating oil needs to be disposed at the most downstream position in the speed reducer to detect an abnormality in the speed reducer with high precision, and it is therefore unlikely to estimate the coil temperature of the motor with this sensor.

It has been proposed in related art to dispose a temperature sensor for the lubricating oil at the most downstream position in a lubrication passage in the speed reducer in the in-wheel motor drive device. In the case where abnormality detection is performed with only the oil temperature sensor over the entire operation range of an in-wheel motor, it is difficult to detect an abnormality in the in-wheel motor drive device with precision, because the temperature of the lubricating oil responds to an increase in the coil temperature after a significant delay in the low-speed high-torque operation. If such a delay in response permits the coil temperature to continue to increase so as to exceed the heat-resistant temperature of the coil, this in turn may cause an overload on the motor.

In another related-art technique, the temperature of a motor coil of a motor section of an in-wheel motor drive device is measured, and a derivative of the coil temperature is calculated, and when the derivative has exceeded a certain threshold value, it is determined that an abnormality has occurred, and output control is performed (see Patent Document 1). It is difficult to detect an abnormality in the in-wheel motor drive device with high precision with only the coil temperature, because an output of a sensor that measures the coil temperature involves a delay in response to an increase in the temperature of the lubricating oil in the high-speed low-torque operation. If such a delay in response permits the temperature of the lubricating oil to increase, for example, beyond the heat-resistant temperature of a resin material of the speed reducer, this in turn may cause an abnormality in the speed reducer.

An object of the present invention is to provide an in-wheel motor drive device which measures both the temperature of a lubricating oil and the temperature of a motor coil, and which is able to detect an abnormality with high precision over the entire operation range of a motor.

The following description is made with reference to reference numerals in embodiments for the sake of convenience and easier understanding.

An in-wheel motor drive device according to one aspect of the present invention includes: an electric motor 1 configured to drive a wheel; a wheel bearing 5 configured to rotatably support the wheel; a speed reducer 2 configured to transmit rotation with a speed that is reduce with respect to that of rotation of the electric motor 1 to the wheel bearing 5; a lubricating oil supply mechanism Jk including a lubricating oil passage 29 formed in a lower portion of the speed reducer 2, and a supply oil passage 30 configured to supply a lubricating oil from the lubricating oil passage 29 to the electric motor 1; an oil temperature sensor Sb disposed in the lubricating oil passage 29 in the speed reducer 2 to measure a temperature of the lubricating oil in the lubricating oil passage 29; a coil temperature sensor Sa disposed on a stator 9 of the electric motor 1 to measure a temperature of a motor coil 78; and a controller U1 configured to control the electric motor 1, and including a motor output limiting module 95 configured to limit an electric current in the electric motor 1 when at least one of the temperature measured by the oil temperature sensor Sb and the temperature measured by the coil temperature sensor Sa has exceeded a corresponding predefined threshold value.

The "predefined threshold value" is determined in advance based on, for example, an experiment or simulation.

Limiting the electric current in the electric motor includes reducing the electric current in the electric motor to "zero".

According to this configuration, the oil temperature sensor Sb disposed in the lubricating oil passage 29 in the speed reducer 2 continuously (i.e., at short time intervals) or regularly measures the temperature of the lubricating oil. The coil temperature sensor Sa disposed on the stator 9 continuously (i.e., at short time intervals) or regularly measures the temperature of the motor coil 78. The motor output limiting module 95 of the controller U1 determines whether at least one of the temperature measured by the oil temperature sensor Sb and the coil temperature measured by the coil temperature sensor Sa has exceeded a corresponding determined first threshold value. If it is determined that at least one of the temperature measured by the oil temperature sensor Sb and the coil temperature measured by the coil temperature sensor Sa has exceeded the threshold value, the motor output limiting module 95 limits the electric current in the electric motor 1.

Heat generation due to losses in the in-wheel motor drive device in low-speed high-torque operation is largely attributable to copper losses in the motor. Therefore, it would be difficult to detect an increase in the coil temperature without a delay by simply measuring the temperature of the lubricating oil with the oil temperature sensor Sb, because the oil temperature responds to the increase in the coil temperature after a delay. In contrast, in this configuration, the coil temperature measured by the coil temperature sensor Sa is used to limit the electric current in the electric motor 1, and this can prevent a delay in detecting an increase in the coil temperature, enabling precise abnormality detection.

In high-speed low-torque operation, core losses in the motor and losses in the speed reducer occupy a large part of the total loss in the in-wheel motor drive device. Therefore, simply measuring the coil temperature with the coil temperature sensor Sa would allow an output of the sensor to respond to an increase in the temperature of the lubricating oil, which cools the speed reducer, after a delay, which may lead to an increase in the temperature of the speed reducer. In contrast, in this configuration, the oil temperature is measured with the oil temperature sensor Sb to determine to limit the electric current in the electric motor 1, and this can prevent a delay in detecting an increase in the temperature of the lubricating oil, thereby preventing an abnormality in the speed reducer 2.

As described above, the electric current in the electric motor 1 is limited without delay, so that an increase in the coil temperature of the electric motor 1 can be inhibited to prevent an overload on the electric motor 1, and an increase in the temperature of the lubricating oil can be inhibited to prevent an abnormality in the speed reducer 2. Therefore, abnormality detection can be achieved with high precision over the entire operation range of the electric motor 1 from the low-speed high-torque operation to the high-speed low-torque operation.

The corresponding threshold value for each of the oil temperature sensor Sb and the coil temperature sensor Sa may include a first threshold value and a second threshold value greater than the first threshold value, and the motor output limiting module 95 may start limiting an output to the electric motor 1 when at least one of the temperature measured by the oil temperature sensor Sb and the temperature measured by the coil temperature sensor Sa has exceeded the first threshold value, and reduce the electric current in the electric motor 1 to zero when the at least one of the temperature measured by the oil temperature sensor Sb and the temperature measured by the coil temperature sensor Sa has exceeded the second threshold value.

Each of the first and second threshold values is determined based on, for example, an experiment or simulation.

By limiting the output to the electric motor 1 in a stepwise manner as described above, a driver who operates an accelerator can be prevented from having an uncomfortable feeling, so that smooth running of a vehicle can be achieved.

The motor output limiting module 95 may reduce a torque command value to be inputted to the electric motor 1 at a fixed rate when at least one of the temperature measured by the oil temperature sensor Sb and the temperature measured by the coil temperature sensor Sa has exceeded the first threshold value. The fixed rate includes predefined fixed rates that are determined for the respective oil and coil temperatures.

As the fixed rate, the predefined fixed rate (i.e., the fixed value) that is determined for the oil or coil temperature is used depending on whether the temperature that has exceeded the first threshold value is the oil temperature or the coil temperature. That is, the predefined fixed rates are different from each other for the respective oil and coil temperatures.

Each of the predefined fixed rates is determined appropriately based on, for example, an experiment or simulation.

By reducing the torque command value with a fixed gradient as described above, a sharp change in the torque command value in accordance with an operation of the accelerator can be prevented.

If, after exceeding the first and second threshold values, at least one of the temperature measured by the oil temperature sensor Sb and the temperature measured by the coil temperature sensor Sa falls below the first threshold value after elapse of a certain time period from a time at which the at least one of the temperature measured by the oil temperature sensor Sb and the temperature measured by the coil temperature sensor Sa exceeds the second threshold value, the motor output limiting module 95 may stop limiting the electric current in the electric motor 1 at that time. The certain time period is determined based on a test or simulation. By stopping the limiting of the electric current in the electric motor 1, that is, inputting an accelerator command value without changing, on the above condition, a motor torque can be recovered to realize a driving in accordance with an intention of the driver.

The lubricating oil supply mechanism Jk may include a pump 28 configured to supply the lubricating oil from the lubricating oil passage 29 to the electric motor 1 through the supply oil passage 30, the pump 28 being disposed between the electric motor 1 and the speed reducer 2 so as to be concentric with the electric motor 1 and the speed reducer 2.

The pump 28 may be provided outside of an in-wheel motor drive device unit enclosing the electric motor 1, the wheel bearing 5, and the speed reducer 2. In this case, for example, a lubricating oil tank in a body of the device can be dispensed with, so that the number of oil passages to be provided in the device unit can be reduced. This allows the device unit to be made compact. Therefore, the in-wheel motor drive device is adapted to be mounted in various kinds of vehicles, so that the versatility of the in-wheel motor drive device can be improved.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
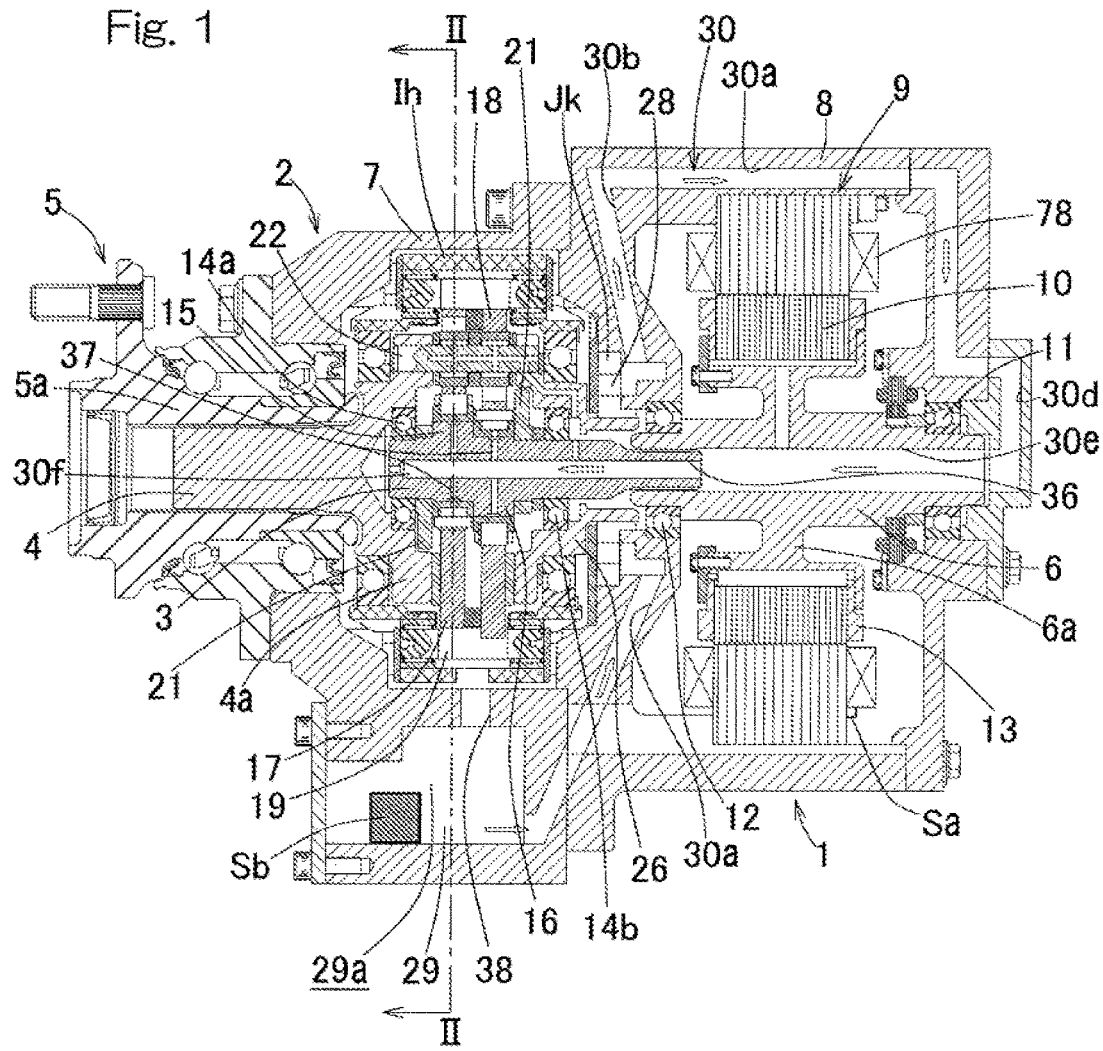
FIG. 1 is a sectional view of an in-wheel motor drive device according to a first embodiment of the present invention.

An in-wheel motor drive device according to a first embodiment of the present invention will be described with reference to FIGS. 1 to 5. As illustrated in FIG. 1, the in-wheel motor drive device includes: an electric motor 1 configured to drive a wheel; a speed reducer 2 configured to reduce the speed of rotation of the electric motor 1; a wheel bearing 5 caused to rotate by an output member 4 coaxial with an input shaft 3 (hereinafter, referred to as a "speed reducer input shaft 3") of the speed reducer 2; a lubricating oil supply mechanism Jk; and a controller U1 (see FIG. 4). The speed reducer 2 is interposed between the wheel bearing 5 and the electric motor 1. A wheel hub of a drive wheel supported by the wheel bearing 5 is concentrically coupled to a motor rotating shaft 6 of the electric motor 1, the speed reducer input shaft 3, and the output member 4.

A suspension (not shown) of a vehicle is coupled to a speed reducer housing 7 that houses the speed reducer 2. Herein, an outer side and an inner side, i.e., a side closer to the longitudinal center of the vehicle body, with the in-wheel motor drive device assembled in the vehicle, are referred to as an outboard side and an inboard side, respectively.

The electric motor 1 includes an IPM motor (a so-called Interior Permanent Magnet synchronous motor) of a radial gap type. In this type, a radial gap is defined between a motor stator 9 fixed to a motor housing 8 and a motor rotor 10 attached to the motor rotating shaft 6. On the motor housing 8 bearings 11 and 12 are provided to be separated from each other in an axial direction. The motor rotating shaft 6 is rotatably supported by the bearings 11 and 12.

The motor rotating shaft 6 is configured to transmit a driving force of the electric motor 1 to the speed reducer 2. A flange portion 6a extending radially outward is provided near an axial middle of the motor rotating shaft 6, On the flange portion 6a a rotor fixing member 13 is provided. The motor rotor 10 is attached to the rotor fixing member 13.

A coil temperature sensor Sa is disposed on the motor stator 9 of the electric motor 1 to measure the temperature of a motor coil 78. The coil temperature sensor Sa includes, for example, a thermistor. The temperature measured by the coil temperature sensor Sa is used to make a determination in control of limiting an electric current in the electric motor 1 as described below.

The speed reducer input shaft 3 is spline-fitted to the motor rotating shaft 6, with one axial end of the speed reducer input shaft 3 extending into the motor rotating shaft 6. The output member 4 includes a cup portion 4a in which a bearing 14a is fitted. The cup portions 4a is coupled to a tubular joining member 26 through inner pins 22. In the tubular joining member 26 a bearing 14b is fitted. The speed reducer input shaft 3 is rotatably supported by the bearings 14a and 14b. At the outer circumferential surface of the speed reducer input shaft 3 inside the speed reducer housing 7 eccentric portions 15 and 16 are provided. The eccentric portions 15 and 16 are displaced 180 degrees in phase from each other such that centrifugal forces generated by eccentric motions of the eccentric portions 15 and 16 are cancelled.

The speed reducer 2 includes a cycloidal speed reducer. The cycloidal speed reducer includes an outer pin housing Ih, the speed reducer input shaft 3, curvilinear plates 17 and 18, a plurality of outer pins 19, the inner pins 22, and a counter weight 21.

Figure 2:
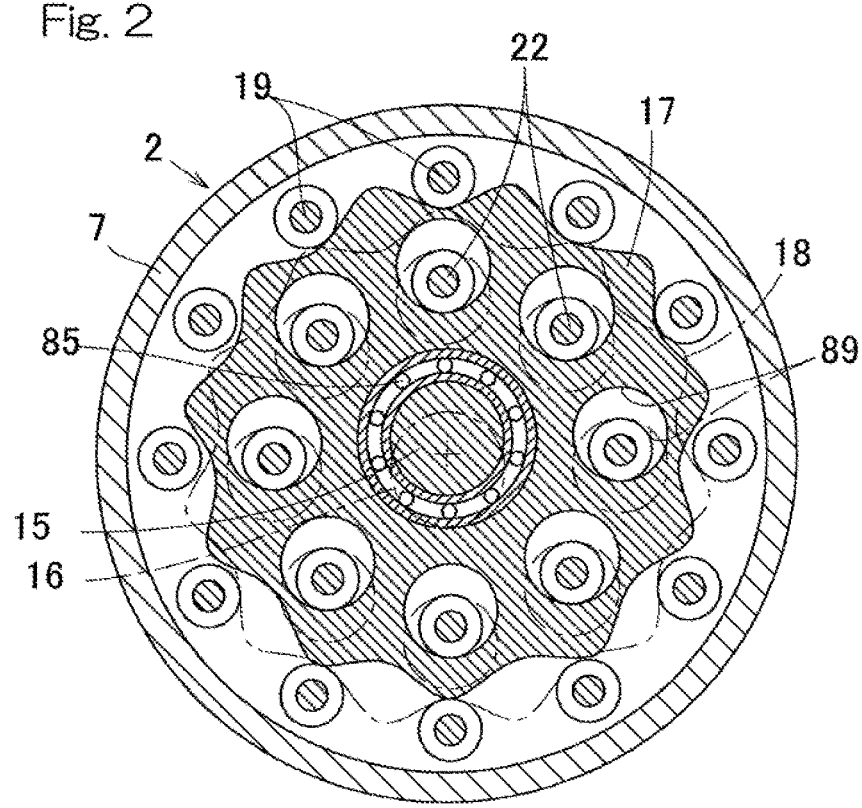
FIG. 2 is a sectional view of a speed reducer section taken along line II-II in FIG. 1.

FIG. 2 is a sectional view of a speed reducer section taken along line II-II in FIG. 1. In the speed reducer 2, the two curvilinear plates 17 and 18, each of which has an external shape formed by a smooth wavelike trochoidal curve, are attached to the eccentric portions 15 and 16 through bearings 85, respectively. The plurality of outer pins 19, which guide the eccentric motions of the respective curvilinear plates 17 and 18 at the outer peripheries thereof, are fitted to the outer pin housing Ih (see FIG. 1) inside the speed reducer housing 7. The plurality of inner pins 22, which are fitted to the cup portion 4a (see FIG. 1), are inserted in and engaged with a plurality of round through holes 89, which are formed in each of the curvilinear plates 17 and 18.

Figure 3:
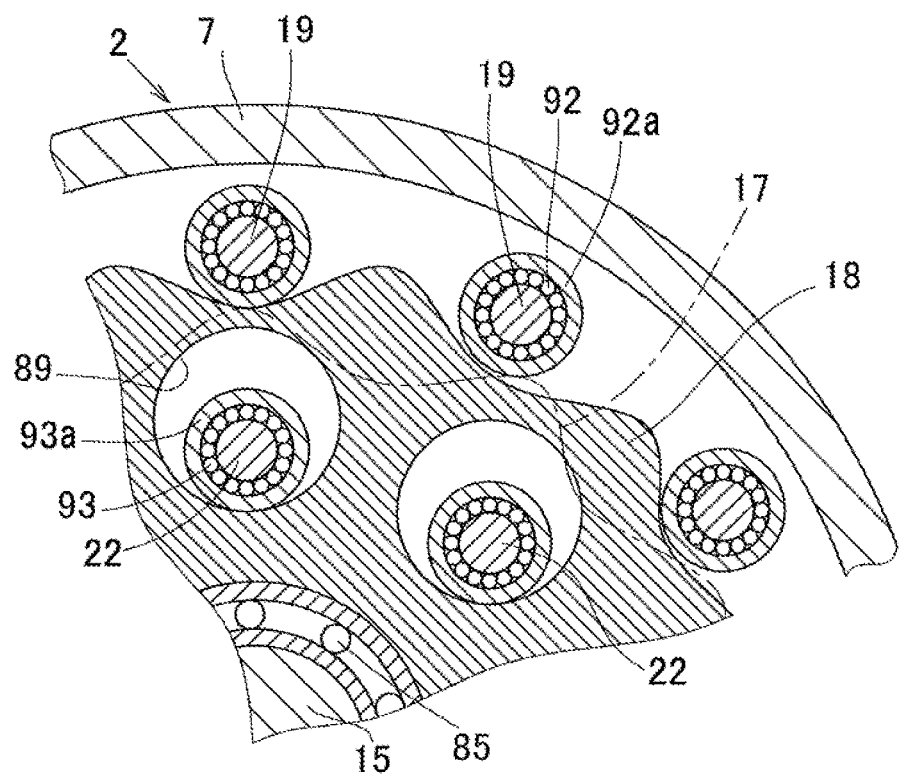
FIG. 3 is an enlarged view of a portion of FIG. 2.

As shown in an enlarged view of FIG. 3, needle roller bearings 92 and 93 are fitted to the outer and inner pins 19 and 22, respectively. Each outer pin 19 is supported at both ends thereof by the needle roller bearing 92 so as to be in rolling contact with the outer peripheral surface of each of the curvilinear plates 17 and 18. At each inner pin 22, an outer ring 93a of the needle roller bearing 93 is in rolling contact with the inner peripheries of the corresponding round through holes 89 of the curvilinear plates 17 and 18. Accordingly, contact resistance between outer pins 19 and the outer peripheries of the curvilinear plates 17 and 18 and contact resistance between inner pins 22 and the inner peripheries of the corresponding through holes 89 are reduced.

Thus, referring to FIG. 1, the eccentric motions of the curvilinear plates 17 and 18 can be smoothly transmitted as rotational motion to an inner member 5a of the wheel bearing 5. Specifically, when the motor rotating shaft 6 rotates, each of the curvilinear plates 17 and 18 provided on the speed reducer input shaft 3, which rotates together with the motor rotating shaft 6, makes eccentric motion. At this time, outer pins 19 are engaged with the outer peripheral surfaces of the curvilinear plates 17 and 18 making the eccentric motions so as to be in rolling contact therewith, and inner pins 22 are engaged with the round through holes 89 (see FIG. 3) of the curvilinear plates 17 and 18, thereby allowing only rotation motions of the curvilinear plates 17 and 18 to be transmitted as rotational motion to the output member 4 and the inner member 5a. Thus, the speed of the rotation of the inner member 5a is reduced from the speed of the rotation of the motor rotating shaft 6.

The lubricating oil supply mechanism Jk includes a shaft oil supply mechanism configured to supply a lubricating oil to be used for both lubricating the speed reducer 2 and cooling the electric motor 1, through an interior of the motor rotating shaft 6. The lubricating oil supply mechanism Jk includes a lubricating oil passage 29, a supply oil passage 30, a discharge oil passage 38, and a pump 28. The lubricating oil passage 29 is formed inside the speed reducer housing 7 of the speed reducer 2. The lubricating oil passage 29 includes a lubricating oil tank 29a. The lubricating oil tank 29a is positioned at a lower portion of the speed reducer housing 7 to store the lubricating oil, and is in communication with a lower space inside the motor housing 8.

The supply oil passage 30 configured to supply the lubricating oil from the lubricating oil tank 29a to the electric motor 1 and the speed reducer 2. The supply oil passage 30 includes a suction-side oil passage 30a, a discharge-side oil passage 30b, a housing outer periphery-side oil passage 30c, a communicating passage 30d, a motor rotating shaft oil passage 30e, and a speed reducer oil passage 30f. The suction-side oil passage 30a extends from a suction port in the lubricating oil tank 29a to an inlet port of the pump 28, and is formed in the lower portion of the speed reducer housing 7 and a lower portion of the motor housing 8. The discharge-side oil passage 30b in communication with a discharge port of the pump 28, and extends substantially radially outward inside the motor housing 8.

The housing outer periphery-side oil passage 30c is in communication with the discharge-side oil passage 30b, and extends along the axial direction from the outboard side to the inboard side inside the motor housing 8. The communicating passage 30d is formed at an inboard-side end of the motor housing 8, and an inlet of the communicating passage 30d is connected to the housing outer periphery-side oil passage 30c, and an outlet of the communicating passage 30d is connected to the motor rotating shaft oil passage 30e.

The motor rotating shaft oil passage 30e extends along a central axis of the motor rotating shaft 6. A portion of the lubricating oil that is guided into the motor rotating shaft oil passage 30e from the communicating passage 30d passes through a through hole extending radially outward through the motor rotating shaft 6 and the flange portion 6a and then through an oil passage extending radially outward and formed inside the rotor fixing member 13, thereby cooling the motor rotor 10. Further, the lubricating oil is ejected to the inner peripheral surface of coil ends through an oil outlet of the oil passage by a centrifugal force of the motor rotor 10 and pressure by the pump 28, thereby cooling the coil 78.

The speed reducer oil passage 30f is formed in the speed reducer 2 to supply the lubricating oil to the speed reducer 2. The speed reducer oil passage 30f includes an input shaft oil passage 36 and oil supply ports 37. The input shaft oil passage 36 is in communication with the motor rotating shaft oil passage 30e, and extends in the axial direction inside the speed reducer input shaft 3 from an inboard-side end of the speed reducer input shaft 3 to the outboard side. The oil supply ports 37 extend radially outward from axial positions in the input shaft oil passage 36 at which the eccentric portions 15 and 16 are provided.

The discharge oil passage 38, which discharges the lubricating oil that has lubricated the speed reducer 2, to the lubricating oil tank 29a, is formed in the speed reducer housing 7.

The pump 28 sucks the lubricating oil stored in the lubricating oil tank 29a, through the suction port in the lubricating oil tank 29a and the suction-side oil passage 30a, and causes the lubricating oil to flow sequentially through the discharge-side oil passage 30b, the housing outer periphery-side oil passage 30c, and the communicating passage 30d to the motor rotating shaft oil passage 30e and the speed reducer oil passage 30f to achieve a circulation. The pump 28 is disposed between the electric motor 1 and the speed reducer 2 so as to be concentric with the electric motor 1 and the speed reducer 2. The pump 28 may be a cycloidal pump including an inner rotor (not shown) caused to rotate by the rotation of the output member 4, an outer rotor that rotates following the rotation of the inner rotor, a pump chamber, an inlet port, and a discharge port (all of which are not shown).

When the rotation of the output member 4 driven by the electric motor 1 causes the inner rotor to rotate, the outer rotor rotates following the rotation of the inner rotor. In this period, the inner rotor and the outer rotor rotate about different rotation axes, so that the volume of the pump chamber continuously varies. This causes the lubricating oil stored in the lubricating oil tank 29a to be sucked through the suction port and the suction-side oil passage 30a to flow into the pump 28 through the inlet port, and to be supplied under pressure through the discharge port to the discharge-side oil passage 30b, the housing outer periphery-side oil passage 30c, and the communicating passage 30d sequentially.

The lubricating oil is guided from the communicating passage 30d into the motor rotating shaft oil passage 30e. A portion of the lubricating oil cools the motor rotor 10 and the coils 78 as mentioned above, then moves downward inside the motor housing 8 by gravity, and flows into the lubricating oil tank 29a, which is in communication with the lower space inside the motor housing 8.

A portion of the lubricating oil that is guided from the motor rotating shaft oil passage 30e to each oil supply port 37 through the input shaft oil passage 36 is discharged through a radially outer opening end of the oil supply port 37. A centrifugal force and the pressure by the pump 28 act on this lubricating oil, and the lubricating oil accordingly moves radially outward inside the speed reducer housing 7 while lubricating various components of the speed reducer 2. Then, the lubricating oil moves downward by gravity into the lubricating oil tank 29a through the oil discharge port 38, and is stored in the lubricating oil tank 29a. An oil temperature sensor Sb, which measures the temperature of the lubricating oil, is disposed in the lubricating oil tank 29a. The oil temperature sensor Sb is, for example, a thermistor. The temperature measured by the oil temperature sensor Sb is used to make a determination in the control of limiting the electric current in the electric motor 1 as described below.

A control system will now be described below.

Figure 4:
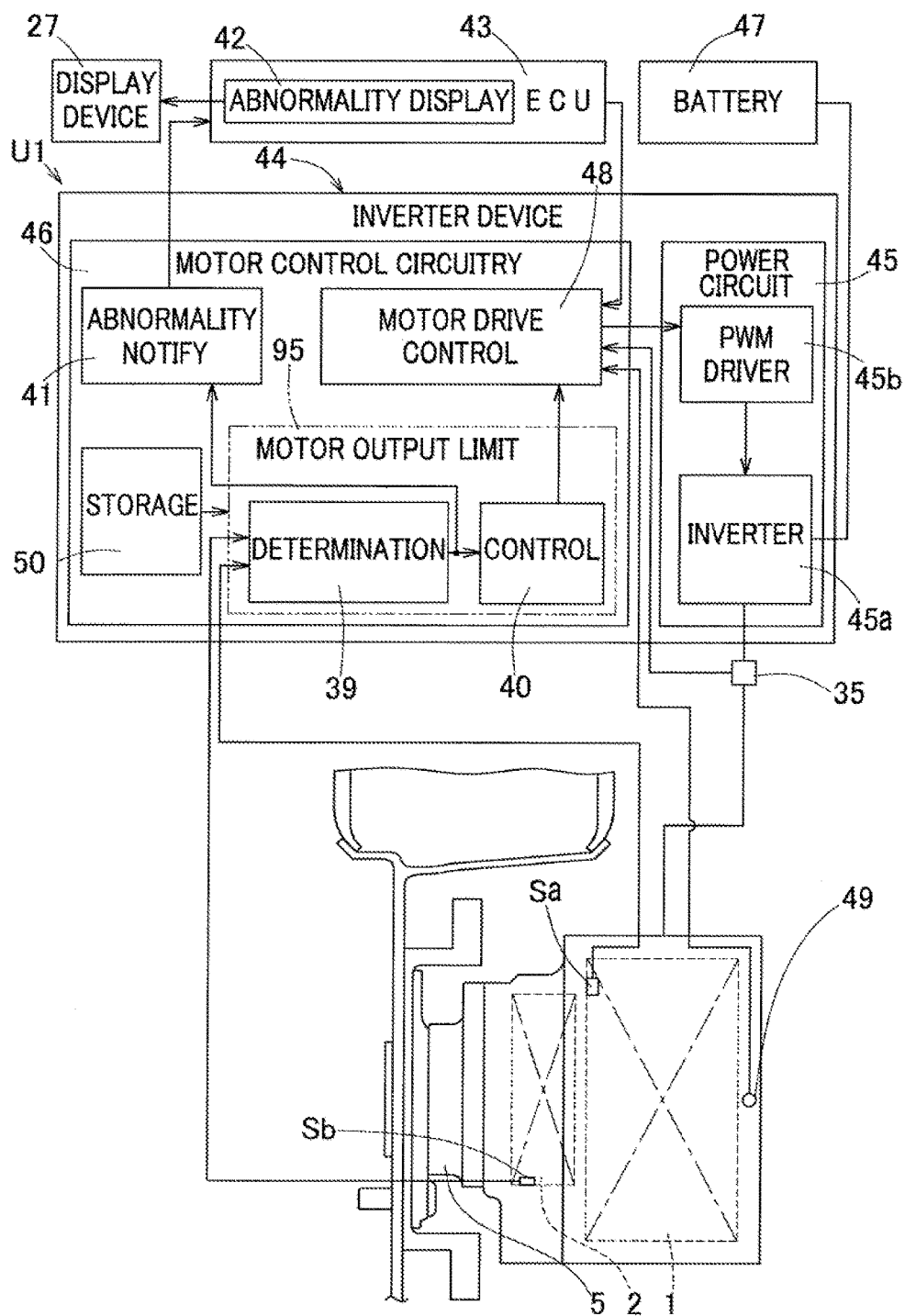
FIG. 4 is a block diagram of a control system of the in-wheel motor drive device illustrated in FIG. 1.

FIG. 4 is a block diagram of a control system of the in-wheel motor drive device.

The controller U1 includes an ECU 43, which acts as an electronic control unit configured to perform overall control of the vehicle (the automobile), and an inverter device 44 configured to perform control of the electric motor 1, which acts as a traction motor responding to commands from the ECU 43. The inverter device 44 includes a power circuit section 45 provided for each electric motor 1, and a motor control circuitry 46 which controls the power circuit section 45. The motor control circuitry 46 is configured to output various types of information, including various measured values and control values related to the in-wheel motor drive device, which are stored in the motor control circuitry 46, to the ECU 43.

The power circuit section 45 includes an inverter 45a configured to convert a direct-current power from a battery 47 into a three-phase alternating-current power to be used to drive the electric motor 1, and also includes a PWM driver 45b configured to control the inverter 45a. The inverter 45a includes a plurality of semiconductor switching devices (not shown), and the PWM driver 45b performs pulse-width modulation on a received electric current command by generating ON/OFF commands to the semiconductor switching devices.

The motor control circuitry 46 includes a computer, programs which are executed by the computer, and various electronic circuits. The motor control circuitry 46 includes a motor drive control module 48 which serves as a basic control component. The motor drive control module 48 is configured to convert acceleration or deceleration commands, such as torque commands, supplied from the ECU 43, which serves as an upper-level control unit, into the electric current commands, and supply the electric current commands to the PWM driver 45b. The motor drive control module 48 obtains, from an electric current sensor 35, a motor electric current that flows from the inverter 45a to the electric motor 1, and performs an electric current feedback control. In addition, the motor drive control module 48 obtains a rotational angle of the motor rotor of the electric motor 1 from an angle sensor 49 and performs a vector control.

The motor control circuitry 46 includes a motor output limiting module 95, an abnormality notification module 41, and a storage module 50. The motor output limiting module 95 is configured to limit the electric current in the electric motor 1 when at least one of the temperature (referred to as an "oil temperature") measured by the oil temperature sensor Sb and the temperature (referred to as a "coil temperature") of the motor coil measured by the coil temperature sensor Sa has exceeded a corresponding predefined threshold value. The motor output limiting module 95 includes a determination submodule 39 and a control submodule 40.

The determination submodule 39 is configured to determine continuously (i.e., at short time intervals) whether the oil temperature and the coil temperature have exceeded the respective predefined threshold values. The threshold value for the oil temperature is determined in advance through an experiment or simulation. For example, the value is set based on the relationship between the oil temperature and the viscosity of the lubricating oil, and/or the relationship between the viscosity of the lubricating oil and rotational resistance of the electric motor 1. The threshold value for the coil temperature is determined in advance appropriately through an experiment or simulation. For example, the value is set based on the relationship between time and the coil temperature that causes insulation in the motor coil.

Each threshold value is stored in the storage module 50 so as to be rewritable. In this embodiment, each of the threshold value for the temperature measured by the oil temperature sensor Sb and the threshold value for the temperature measured by the coil temperature sensor Sa includes a first threshold value and a second threshold value greater than the first threshold value.

If it is determined that at least one of the measured oil temperature and the measured coil temperature has exceeded the corresponding predefined threshold value, the control submodule 40 instructs the power circuit section 45 via the motor drive control module 48 to reduce the electric current in the electric motor 1.

Figure 5:
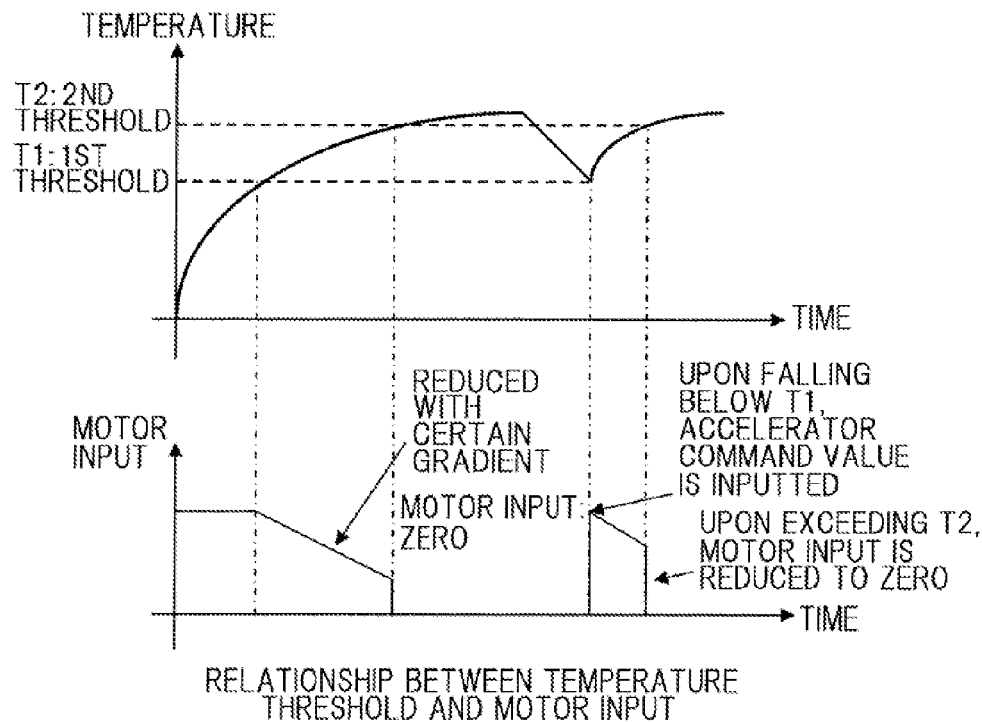
FIG. 5 is a diagram illustrating the relationship between threshold values with respect to a temperature and motor input.

FIG. 5 is a diagram illustrating the relationship between the threshold values for the coil temperature and motor input. Although not shown, the threshold values for the oil temperature and the motor input have a relationship similar to the relationship as illustrated in FIG. 5. A description will be given with reference to FIG. 4 as well. For example, assume that, of the measured coil temperature and the measured oil temperature, the measured coil temperature has exceeded the corresponding first threshold value. When the measured coil temperature has exceeded the first threshold value, the control submodule 40 starts limiting the output to the electric motor 1. Specifically, when the measured coil temperature has exceeded the first threshold value, the control submodule 40 instructs the power circuit section 45 via the motor drive control module 48 to reduce a torque command value to be inputted to the electric motor 1 at a fixed rate (i.e., with a fixed gradient). The fixed rate includes fixed rates which are determined in advance for the respective oil temperature and coil temperature.

Assume that, of the measured coil temperature and the measured oil temperature, the measured coil temperature, for example, has thereafter exceeded the corresponding second threshold value. When the measured coil temperature has exceeded the second threshold value, the control submodule 40 instructs the power circuit section 45 via the motor drive control module 48 to reduce the electric current in the electric motor 1 to zero. When, after exceeding the first and second threshold values, the measured coil temperature falls below the first threshold value after elapse of a certain time period from the time at which the measured coil temperature exceeds the second threshold value, the control submodule 40 stops limiting the output to the electric motor 1 at that time.

As illustrated in FIG. 4, the abnormality notification module 41 outputs abnormality occurrence information to the ECU 43 when the determination submodule 39 has determined that at least one of the measured oil temperature and the measured coil temperature has exceeded the corresponding first threshold value. Upon reception of the abnormality occurrence information outputted from the abnormality notification module 41, an abnormality display module 42 in the ECU 43 causes a display device 27, such as a console panel of the vehicle, for example, to perform a display for reporting an abnormality.

Advantageous effects will now be described below.

The determination submodule 39 in the motor output limiting module 95 determines whether at least one of the measured oil temperature and the measured coil temperature has exceeded the corresponding predefined threshold value. If it is determined that at least one of the measured oil temperature and the measured coil temperature has exceeded the threshold value, the control submodule 40 instructs the power circuit section 45 via the motor drive control module 48 to reduce the torque command value to be inputted to the electric motor 1.

Heat generation due to losses in the in-wheel motor drive device in low-speed high-torque operation is largely attributable to copper losses in the motor. Therefore, it would be difficult to detect an increase in the coil temperature without a delay by simply measuring the temperature of the lubricating oil with the oil temperature sensor Sb, because the oil temperature responds to the increase in the coil temperature after a delay. In contrast, in the present embodiment, the coil temperature measured by the coil temperature sensor Sa is used to determine to limit the electric current in the electric motor 1, and this can prevent a delay in detecting an increase in the coil temperature, enabling precise abnormality detection.

In high-speed low-torque operation, core losses in the motor and losses in the speed reducer occupy a large part of the total loss in the in-wheel motor drive device. Therefore, simply measuring the coil temperature with the coil temperature sensor Sa would allow an output of the sensor to respond to an increase in the temperature of the lubricating oil, which cools the speed reducer, after a delay, which may lead to an increase in the temperature of the speed reducer. In contrast, in the present embodiment, the oil temperature is measured with the oil temperature sensor Sb to determine to limit the electric current in the electric motor 1, and this can prevent a delay in detecting an increase in the temperature of the lubricating oil, thereby preventing an abnormality in the speed reducer 2.

As described above, the electric current in the electric motor 1 is limited without delay, so that an increase in the coil temperature of the electric motor 1 can be inhibited to prevent an overload on the electric motor 1, and an increase in the temperature of the lubricating oil can be inhibited to prevent an abnormality in the speed reducer 2. Therefore, abnormality detection can be achieved with high precision over the entire operation range of the electric motor 1 from the low-speed high-torque operation to the high-speed low-torque operation.

The motor output limiting module 95 starts limiting the output to the electric motor 1 when at least one of the measured oil temperature and the measured coil temperature has exceeded the corresponding first threshold value, and reduces the electric current to the electric motor 1 to zero when the at least one of the measured oil temperature and the measured coil temperature has exceeded the corresponding second threshold value. By limiting the output to the electric motor 1 in a stepwise manner, a driver who operates an accelerator can be prevented from having an uncomfortable feeling, so that smooth running of the vehicle can be achieved. In addition, the motor output limiting module 95 reduces the torque command value to be inputted to the electric motor 1 at the fixed rate when at least one of the temperature measured by the oil temperature sensor Sb and the temperature measured by the coil temperature sensor Sa has exceeded the first threshold value, and this can prevent a sharp change in the torque command value in accordance with an operation of the accelerator.

A second embodiment will now be described below.

In the following description, portions corresponding to the matters described in the preceding embodiment will be denoted by the same reference numerals, and the redundant description thereof is omitted. When only a part of such a configuration is described, the remaining part of the configuration should be understood to be the same as in the preceding embodiment unless otherwise noted. Like configurations produce like advantageous effects. Portions described specifically in different embodiments may be combined, and different embodiments may be partially combined as long as no conflict arises from the combination.

Figure 6:
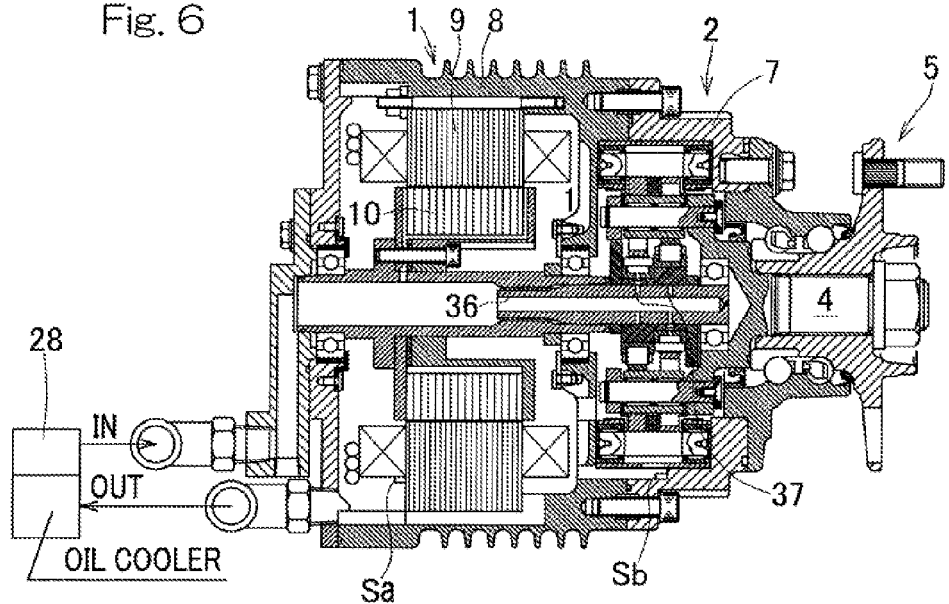
FIG. 6 is a sectional view of an in-wheel motor drive device according to a second embodiment of the present invention.
Figure 7:
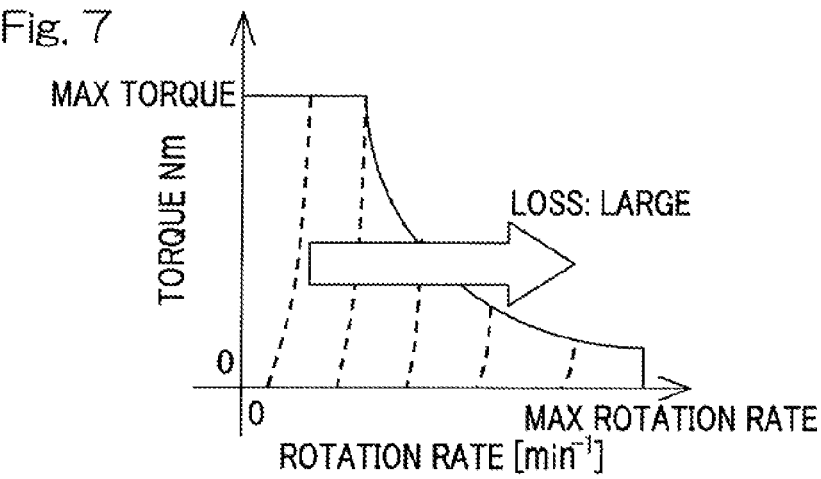
FIG. 7 is a diagram illustrating a typical example of a loss map of a speed reducer.
Figure 8:
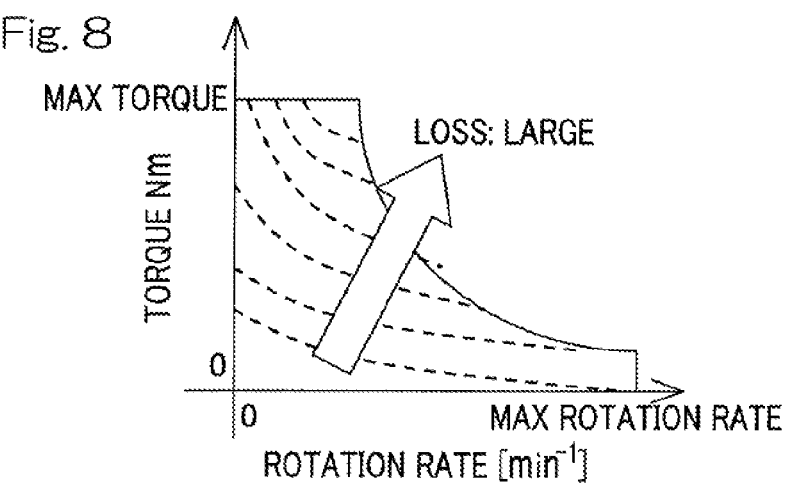
FIG. 8 is a diagram illustrating a typical example of a loss map of a motor.
Figure 9:
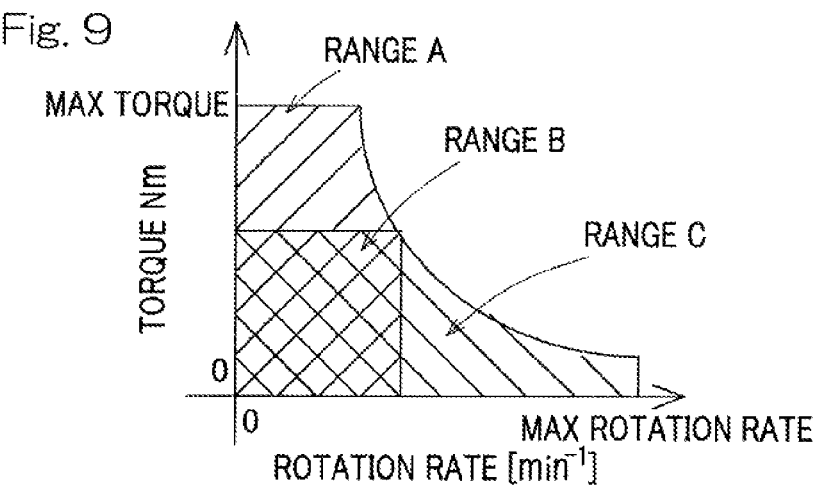
FIG. 9 is a diagram illustrating a typical example of a loss map of an in-wheel motor drive device.

As illustrated in FIG. 6, a pump 28 may be provided outside of an in-wheel motor drive device unit enclosing an electric motor 1, a wheel bearing 5, and a speed reducer 2. The pump 28 may be driven by a driving source different from that for this in-wheel motor drive device. In this case, a lubricating oil tank in a speed reducer housing 7 can be dispensed with, so that the number of oil passages to be provided in a motor housing 8 can be reduced. This allows the device unit to be made compact. Therefore, the in-wheel motor drive device is adapted to be mounted in various kinds of vehicles, so that the versatility of the in-wheel motor drive device can be improved.

The motor output limiting module may be configured to reduce a motor electric current to a rate (for example, 90%) determined for a present motor electric current or to a determined value when at least one of the measured temperatures has exceeded the corresponding first threshold value.

The motor output limiting module may be configured to reduce the motor electric current with a fixed gradient (i.e., at a fixed rate) when at least one of the measured temperatures has exceeded the corresponding first threshold value, and reduce the motor electric current with a gradient steeper than the fixed gradient, that is, at a rate greater than the aforementioned rate, when the at least one of the measured temperatures has exceeded the second threshold value. The gradient of the motor electric current may not necessarily be linear, but may be, for example, a gradient of a quadratic curve or the like.

The oil temperature sensor may be disposed in the lubricating oil passage in the speed reducer and outside of the lubricating oil tank.

Although the cycloidal speed reducer is employed as an example speed reducer in the above-described embodiments, the speed reducer is not limited thereto, and may include a planetary speed reducer, a speed reducer with two parallel shafts, and other speed reducers.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 ... electric motor
2 ... speed reducer
5 ... wheel bearing
28 ... pump
29 ... lubricating oil passage
30 ... supply oil passage
38 ... discharge oil passage
95 ... motor output limiting module
Jk ... lubricating oil supply mechanism
U1 ... controller
Sa ... coil temperature sensor
Sb ... oil temperature sensor

What is claimed is:

1. An in-wheel motor drive device comprising:
   an electric motor configured to drive a wheel;
   a wheel bearing configured to rotatably support the wheel;
   a speed reducer configured to transmit rotation with a speed that is reduced with respect to that of rotation of the electric motor to the wheel bearing;
   a lubricating oil supply mechanism including a lubricating oil passage formed inside a speed reducer housing of the speed reducer, and a supply oil passage configured to supply a lubricating oil from the lubricating oil passage to the electric motor;
   an oil temperature sensor disposed in the lubricating oil passage in the speed reducer to measure a temperature of the lubricating oil in the lubricating oil passage;
   a coil temperature sensor disposed on a stator of the electric motor to measure a temperature of a motor coil; and
   a controller configured to control the electric motor, and including a motor output limiting module configured to limit an electric current in the electric motor when at least one of the temperature measured by the oil temperature sensor and the temperature measured by the coil temperature sensor has exceeded a corresponding predefined threshold value.

2. The in-wheel motor drive device as claimed in claim 1, wherein
   the corresponding threshold value for each of the oil temperature sensor and the coil temperature sensor includes a first threshold value and a second threshold value greater than the first threshold value, and
   the motor output limiting module starts limiting the electric current in the electric motor when at least one of the temperature measured by the oil temperature sensor and the temperature measured by the coil temperature sensor has exceeded the first threshold value, and reduces the electric current in the electric motor to zero when the at least one of the temperature measured by the oil temperature sensor and the temperature measured by the coil temperature sensor has exceeded the second threshold value.

3. The in-wheel motor drive device as claimed in claim 2, wherein
   the motor output limiting module reduces a torque command value to be inputted to the electric motor at a fixed rate when at least one of the temperature measured by the oil temperature sensor and the temperature measured by the coil temperature sensor has exceeded the first threshold value, the fixed rate including fixed rates that are determined in advance for the respective oil and coil temperatures.

4. The in-wheel motor drive device as claimed in claim 2, wherein
   if, after exceeding the first and second threshold values, at least one of the temperature measured by the oil temperature sensor and the temperature measured by the coil temperature sensor falls below the first threshold value after elapse of a certain time period from a time at which the at least one of the temperature measured by the oil temperature sensor and the temperature measured by the coil temperature sensor exceeds the second threshold value, the motor output limiting module stops limiting the electric current in the electric motor at that time.

5. The in-wheel motor drive device as claimed in claim 1, wherein
   the lubricating oil supply mechanism further includes a pump configured to supply the lubricating oil from the lubricating oil passage to the electric motor through the supply oil passage, the pump being disposed between the electric motor and the speed reducer so as to be concentric with the electric motor and the speed reducer.

6. The in-wheel motor drive device as claimed in claim 1, wherein
   the lubricating oil supply mechanism further includes a pump configured to supply the lubricating oil from the lubricating oil passage to the electric motor through the supply oil passage, the pump being provided outside of an in-wheel motor drive device unit enclosing the electric motor, the wheel bearing, and the speed reducer.

* * * * *